No. 788,147. PATENTED APR. 25, 1905.
A. SHUMAN.
PROCESS OF MANUFACTURING WIRE PRISM GLASS.
APPLICATION FILED AUG. 20, 1904.
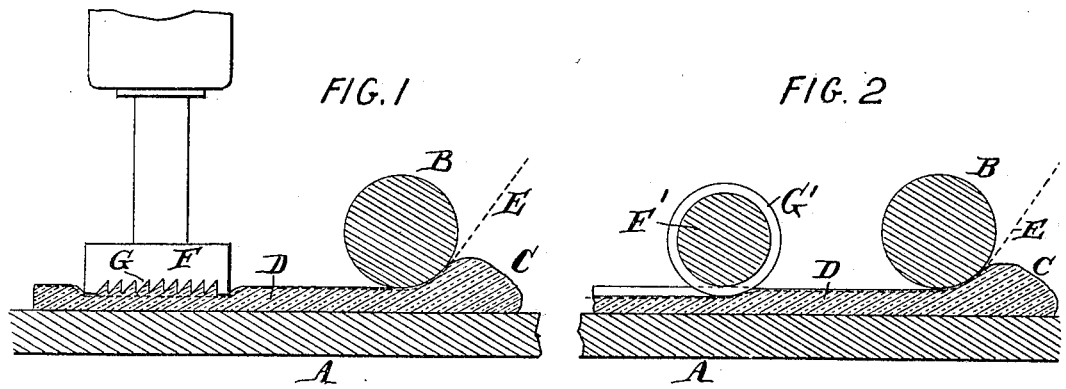
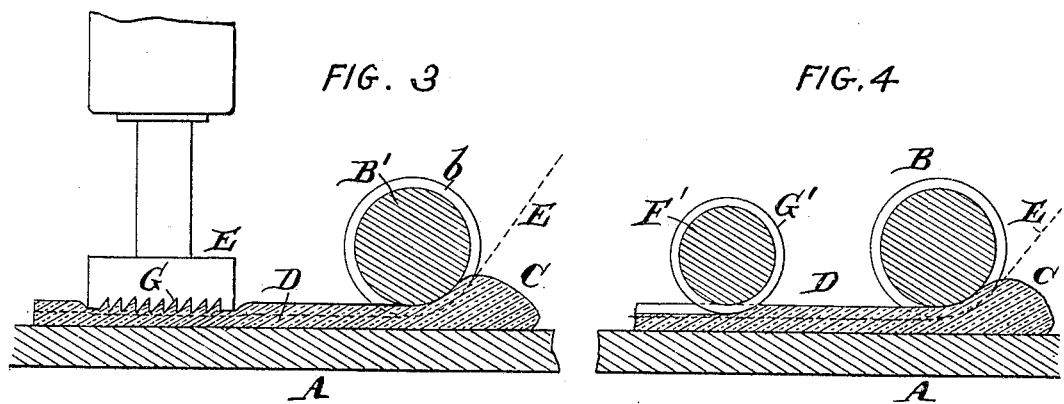
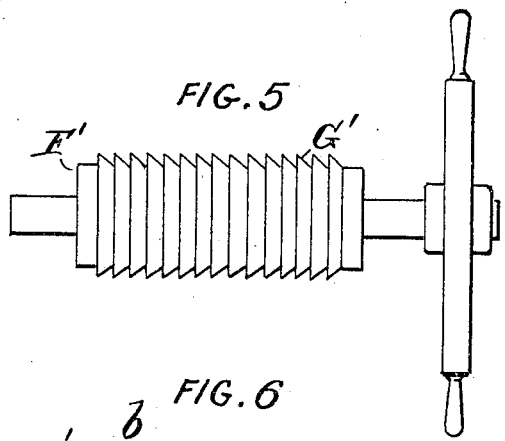
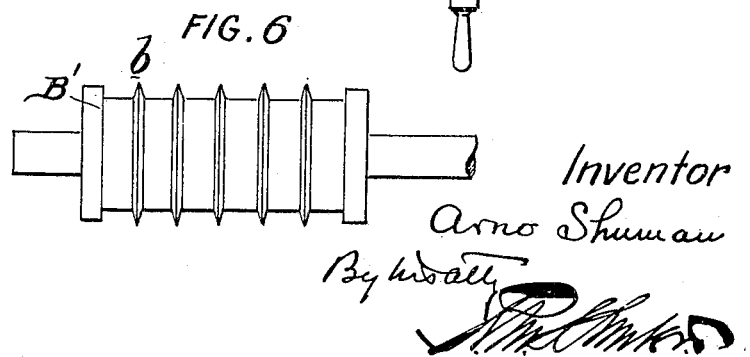
Attest
R. M. Kelly
Inventor
Arno Shuman No. 788,147.

Patented April 25, 1905.

UNITED STATES PATENT OFFICE.

ARNO SHUMAN, OF PHILADELPHIA, PENNSYLVANIA, ASSIGNOR TO THE CONTINUOUS GLASS PRESS COMPANY, A CORPORATION OF PENNSYLVANIA.

PROCESS OF MANUFACTURING WIRE PRISM-GLASS.

SPECIFICATION forming part of Letters Patent No. 788,147, dated April 25, 1905.

Application filed August 20, 1904. Serial No. 221,516.

*To all whom it may concern:*

Be it known that I, ARNO SHUMAN, of the city and county of Philadelphia, State of Pennsylvania, have invented an Improvement in Processes of Manufacturing Wire Prism-Glass, of which the following is a specification.

My invention has reference to a process for the manufacture of wire prism-glass; and it consists of certain improvements, which are fully set forth in the following specification and disclosed in the accompanying drawings, which form a part thereof.

The object of my invention is to manufacture a prism-glass with meshed wire embedded therein below the roots of the prismatic ribs and to produce the same in an inexpensive, simple, and speedy manner.

In carrying out my improved process I roll a ball of molten glass into a sheet and at the same time roll upon or embed into its upper surface a meshed wire, and immediately thereafter and before the glass has cooled I force the meshed wire farther down into the body of the glass, while at the same time forming upon it a series of prismatic ribs by suitable pressure exerted through dies either of a reciprocating or rolling character. In this manner the requisite amount of glass required to form the prismatic ribs is caused to flow above the meshed wire to complete and fill out the series of prisms to suit the particular design desired.

My invention will be better understood by reference to the drawings, in which—

Figure 1 is a sectional elevation of a wire-glass machine adapted for carrying out my improved process of making prism wire-glass. Fig. 2 is a similar view of a modification thereof. Fig. 3 is a similar view of another modified apparatus for producing wire-glass by my improved process. Fig. 4 is a sectional elevation of a modified form of apparatus shown in Fig. 3, substituting grooved rollers for the reciprocating pressure-die. Fig. 5 is an elevation of the grooved rollers shown in Figs. 2 and 4 for forming the prisms, and Fig. 6 is an elevation of the rolls shown in Figs. 3 and 4 for producing the preliminary sheet of glass with the meshed wire therein.

A is a table, upon which the ball of molten glass is placed and upon which it is rolled into a sheet D by the roller B in the well-known manner. During this rolling operation a meshed-wire layer E is rolled into the upper surface of the glass D by being fed under the roller B. Immediately after the roller B is operated and the sheet of glass D formed with the wire E embedded in it a die F, having transverse grooves G on the lower part, is forced down by hydraulic, steam, or other power, further depressing the wire into the glass and causing the glass to pass upward through the meshes thereof, so as to be formed into the series of corrugations or prismatic ribs to be located above the wire. In this manner the wire will be slightly below the roots of the prismatic ribs, due to the dual operation of the downward pressure exerted by the lower part of the die F and by the elastic pressure of the glass, which fills the said die in the act of further compression.

In the use of the particular apparatus shown in Fig. 1 the wire remains close to the root of the prisms.

In the construction shown in Fig. 2 the reciprocating die F is substituted by a grooved roller F', having circumferential prismatic ribs G', and the said roller is rolled longitudinally over the sheet of glass following the roller B. The circumferential edges of the ribs press the wire E down into the body of the glass, forcing the molten glass upward through the meshes thereof and within the grooves of the roller, which rolls the glass over the said meshed wire to produce the same results as the apparatus shown in Fig. 1, but with the ribs or prisms running in the opposite direction.

In the construction shown in Fig. 3 the roller B', which corresponds to the roller B of Fig. 1, is provided with a series of circumferential V-shaped ribs which operate upon the wire E and force it somewhat down into the body of the glass as a preliminary operation and causing considerable glass to flow upward through the meshes of the wire fabric to correspond to the transverse surface configuration of the roller. The sheet of glass so rolled with the wire deposited therein is then subjected to the downward action of the die F, which, operating upon the glass above the wire, forces it downward and completely covers the wire and at the same time molds the prismatic ribs. In this case the meshed wire is forced to a greater extent below the roots of the prismatic ribs than in the case of the use of the apparatus of Fig. 1.

In the construction shown in Fig. 4 I have the same general features embodied in the roller B' shown in Fig. 3; but in place of the die F, I employ a roller F', corresponding to the roller F' of Fig. 2. In this case the roller F' rolls the series of prismatic ribs into the glass above the wire, and because of the excess of glass above the level of the wire the said wire is forced to a material distance below the roots of the prisms.

In practice I prefer to make the circumferential ribs on the rollers B' about one-fourth inch and the depth of the circumferential prismatic ribs of the roller F' in Fig. 4 and the die F in Fig. 3 approximately three-sixteenths inch or slightly less, so that while pressing the glass downward into the ribs or prisms it does not necessarily reach completely down to the wire. Moreover, the less depth of these ribs in the parts F F' compensates for the omission of glass from the V-grooves formed by the rollers B'.

The general process disclosed by the use of the several apparatus mentioned consists, essentially, in rolling the ball of glass down into a sheet with a layer of meshed wire upon or in its surface or slightly below the same, pressing or rolling the glass, which flows through the wire into prisms, so as to completely cover or shield the wire.

Having now described my invention, what I claim as new, and desire to secure by Letters Patent, is as follows:

1. The herein-described process of making wire prism-glass which consists in rolling a ball of molten glass into a sheet with a meshed wire embedded in its surface, and then simultaneously forcing the meshed wire down into the body of the glass and molding the glass which passes above the meshed wire into prismatic ribs.

2. The herein-described process of making wire prism-glass which consists in rolling molten glass into a sheet with meshed wire embedded into its upper part and then, while still hot, molding the glass above the wire into prismatic ribs.

3. The herein-described process of making wire prism-glass which consists in first rolling the molten glass into a sheet with meshed wire embedded in it and then forcing the meshed wire down into the upper part of the sheet of glass and simultaneously molding the glass above the meshed wire into prismatic ribs.

In testimony of which invention I hereunto set my hand.

ARNO SHUMAN.

Witnesses:
T. L. KERR,
W. H. WILLIAMS.